(12) United States Patent
Liu et al.

(10) Patent No.: US 10,132,530 B2
(45) Date of Patent: Nov. 20, 2018

(54) HEAT RECOVERY VARIABLE-FREQUENCY MULTI-SPLIT HEAT PUMP SYSTEM AND CONTROL METHOD THEREOF

(71) Applicants: QINGDAO HISENSE HITACHI AIR-CONDITIONING SYSTEMS CO.,LTD, Shandong (CN); HISENSE USA CORPORATION, Suwanee, GA (US); HISENSE INTERNATIONAL CO.,LTD., Shandong (CN)

(72) Inventors: Min Liu, Shandong (CN); Yuanpeng Wang, Shandong (CN); Wenqiang Zhang, Shandong (CN); Rui Cao, Shandong (CN); Yajun Li, Shandong (CN); Yongmei Li, Shandong (CN)

(73) Assignees: Qingdao Hisense Hitachi Air-Conditioning Systems Co., Ltd., Shandong (CN); Hisense USA Corporation, Suwanee, GA (US); Hisense International Co., Ltd., Shandong (CN)

( * ) Notice: Subject to any disclaimer, the term of this patent is extended or adjusted under 35 U.S.C. 154(b) by 27 days.

(21) Appl. No.: 15/114,269

(22) PCT Filed: Mar. 25, 2014

(86) PCT No.: PCT/CN2014/074046
§ 371 (c)(1),
(2) Date: Jul. 26, 2016

(87) PCT Pub. No.: WO2015/109653
PCT Pub. Date: Jul. 30, 2015

(65) Prior Publication Data
US 2017/0010027 A1    Jan. 12, 2017

(30) Foreign Application Priority Data

Jan. 27, 2014 (CN) .......................... 2014 1 0039143

(51) Int. Cl.
*F25B 13/00*   (2006.01)
*F25B 30/02*   (2006.01)
(Continued)

(52) U.S. Cl.
CPC .............. *F25B 13/00* (2013.01); *F25B 41/04* (2013.01); *F25B 41/046* (2013.01);
(Continued)

(58) Field of Classification Search
CPC .. F25B 30/02; F25B 13/00; F25B 2313/0231; F25B 2313/0232; F25B 2600/2501
See application file for complete search history.

(56) References Cited

U.S. PATENT DOCUMENTS 2,693,930 A * 11/1954 Carter .................. F25B 41/046
                                                    137/625.43
5,253,483 A * 10/1993 Powell ................. B60H 1/3211
                                                    62/181
(Continued)

FOREIGN PATENT DOCUMENTS

CN      1114406     2/1995
CN      1483974     3/2004
(Continued)

OTHER PUBLICATIONS

Design of Vapor-Compression Refrigeration Cycles—Brokowski (1997).*
(Continued)

*Primary Examiner* — Len Tran
*Assistant Examiner* — Jenna M Hopkins
(74) *Attorney, Agent, or Firm* — Hoffmann & Baron, LLP

(57) ABSTRACT

A heat recovery variable-frequency multi-split heat pump system and a control method thereof. The system includes an outdoor unit and at least two indoor units. The system is a
(Continued)

three-pipe heating recovery multi-split heat pump system designed on the basis of a four-way reversing valve, and one indoor unit thereof is provided with two electronic expansion valves and two heat exchangers so that any indoor unit in the system can operate independently under three working conditions of refrigeration, heating or heat recovery dehumidification. Under multi-split condition, the system can operate under six working conditions, namely, the full-refrigeration working condition, the full-heating working condition, the common-heat-recovery working condition, the common-heat-recovery-dehumidification working condition, the heat recovery dehumidification-refrigeration-combination working condition and the heat recovery dehumidification-heating-combination working condition. Under the heat recovery dehumidification condition, a lower outlet air temperature, during low-temperature dehumidification, is raised by means of heat removal of a condenser so as to achieve the purpose of dehumidification without temperature fall or temperature rise, so that the thermal comfort and efficiency of the system are improved, and the refrigerating capacity and heating capacity of the system are effectively improved.

12 Claims, 5 Drawing Sheets

(51) Int. Cl.
F25B 41/04 (2006.01)
F25B 41/06 (2006.01)
F25B 43/02 (2006.01)

(52) U.S. Cl.
CPC .......... *F25B 41/062* (2013.01); *F25B 41/067* (2013.01); *F25B 43/02* (2013.01); *F25B 2313/007* (2013.01); *F25B 2313/0231* (2013.01); *F25B 2313/0232* (2013.01); *F25B 2313/0233* (2013.01); *F25B 2341/065* (2013.01); *F25B 2341/0661* (2013.01); *F25B 2600/2501* (2013.01); *F25B 2600/2513* (2013.01); *F25B 2600/2515* (2013.01); *Y02B 30/72* (2013.01)

(56) References Cited

U.S. PATENT DOCUMENTS

| | | | | |
|---|---|---|---|---|
| 9,506,674 | B2* | 11/2016 | Morimoto | F25B 13/00 |
| 9,651,281 | B2* | 5/2017 | Jeon | F25B 30/02 |
| 9,683,768 | B2* | 6/2017 | Takayama | F25B 13/00 |
| 2004/0134215 | A1* | 7/2004 | Park | F25B 13/00 62/324.1 |
| 2006/0254294 | A1* | 11/2006 | Shimamoto | F24F 3/065 62/238.7 |
| 2010/0146998 | A1* | 6/2010 | Tomioka | F25B 13/00 62/228.3 |
| 2010/0199695 | A1* | 8/2010 | Shinozaki | F24F 1/26 62/238.7 |
| 2011/0048054 | A1* | 3/2011 | Sekine | F25B 13/00 62/324.6 |
| 2011/0100043 | A1* | 5/2011 | Matubara | F24D 5/04 62/238.7 |
| 2011/0314848 | A1* | 12/2011 | Tanaka | F25B 13/00 62/126 |
| 2012/0168139 | A1* | 7/2012 | Takata | F24F 3/065 165/200 |
| 2012/0216989 | A1* | 8/2012 | Wakamoto | F25B 13/00 165/96 |
| 2013/0019622 | A1* | 1/2013 | Nakashima | F25B 13/00 62/160 |
| 2013/0081417 | A1* | 4/2013 | Tamura | F25B 13/00 62/160 |
| 2013/0192284 | A1* | 8/2013 | Kawai | F25D 21/06 62/156 |
| 2013/0213077 | A1* | 8/2013 | Jin | F24F 3/065 62/324.6 |
| 2013/0227977 | A1* | 9/2013 | Morimoto | F25B 13/00 62/126 |
| 2013/0227978 | A1* | 9/2013 | Kawai | F25B 49/02 62/160 |
| 2014/0318734 | A1* | 10/2014 | Shimamoto | F25D 17/02 165/11.1 |
| 2014/0360218 | A1* | 12/2014 | Takenaka | F25B 13/00 62/324.6 |
| 2015/0096321 | A1* | 4/2015 | Kawano | F25B 1/10 62/197 |
| 2015/0176876 | A1* | 6/2015 | Tamura | F25B 13/00 62/196.1 |
| 2015/0219373 | A1* | 8/2015 | Koge | F25B 13/00 62/160 |
| 2015/0233622 | A1* | 8/2015 | Yajima | F25B 13/00 62/129 |
| 2015/0253020 | A1* | 9/2015 | Honda | F25B 13/00 62/190 |
| 2015/0292756 | A1* | 10/2015 | Takenaka | F25B 13/00 62/160 |
| 2015/0316284 | A1* | 11/2015 | Tanaka | F25B 13/00 62/196.1 |
| 2016/0116202 | A1* | 4/2016 | Takenaka | F25B 13/00 62/140 |
| 2016/0146496 | A1* | 5/2016 | Yamashita | F25B 13/00 62/190 |

FOREIGN PATENT DOCUMENTS

| | | | |
|---|---|---|---|
| CN | 1517609 A | 8/2004 | |
| CN | 102003749 A | 4/2011 | |
| CN | 101691960 B * | 10/2012 | |
| CN | 103353147 A | 10/2013 | |
| CN | 105987535 A * | 10/2016 | |
| EP | 1437555 A2 | 7/2004 | |
| EP | 2236957 A2 | 10/2010 | |
| JP | 2975612 B2 * | 11/1999 | |
| JP | 2001227799 | 8/2001 | |
| JP | 2001227841 | 8/2001 | |
| JP | 2002031431 | 1/2002 | |
| JP | WO 0206738 A1 * | 1/2002 | F25B 13/00 |
| JP | 2002089988 A * | 3/2002 | |
| JP | 2006170541 A | 6/2006 | |
| JP | 2010216755 | 9/2010 | |
| JP | WO 2013069043 A1 * | 5/2013 | F25B 13/00 |
| JP | WO 2013179334 A1 * | 12/2013 | F25B 13/00 |
| JP | WO 2014024276 A1 * | 2/2014 | F25B 13/00 |

OTHER PUBLICATIONS

CN101691960B English Machine Translation—Retrieved Nov. 2017.*
JP2975612B2 English Machine Translation—Retrieved Nov. 2017.*
JP2002089988A English Machine Translation—Retrieved Nov. 2017.*
Gravity Separator Fundamentals and Design—Jekel et al. (2001).*
Selecting, Installing Oil Separators—Oct. 2003.*
The First Choice in Secondary Valves—Greenwood Valves (2003).*
Chinese Office Action, Application No. CN 201410039143.3, 7 pages (dated Jun. 2, 2015).

* cited by examiner

HEAT RECOVERY VARIABLE-FREQUENCY MULTI-SPLIT HEAT PUMP SYSTEM AND CONTROL METHOD THEREOF

CROSS-REFERENCE TO RELATED APPLICATIONS

The present application is a US National Stage of International Application No. PCT/CN2014/074046, filed on Mar. 25, 2014, designating the United States, and claiming the benefit of Chinese Patent Application No. 201410039143.3, filed with the Chinese Patent Office on Jan. 27, 2014 and entitled "Heat recovery variable-frequency multi-connected heat pump system and control method thereof", which is hereby incorporated by reference in its entirety.

FIELD

The present invention relates to the field of variable-frequency multi-connected heat pumps, and particularly to a heat recovery variable-frequency multi-connected heat pump system, and a method for controlling the heat pump system.

BACKGROUND

A variable-frequency multi-connected heat pump system is a complex refrigerating system with a complex structure, a large architecture, highly coupled internal parameters, and a variety of boundary conditions, which is characterized by a highly varying incumbent load demand, a large number of connected indoor units, a varying complex operating condition, etc., and is an important direction toward which air conditioners are evolving. As illustrated in FIG. 1, the multi-connected heat pump system generally includes one or more outdoor units 01, one or more indoor units 02, a central control network (CS-NET) 03, a refrigerant pipe 04, a manifold pipe 05, and a communication line 06, where the outdoor units constitute a set of outdoor units controlled by the central control network through the communication line, and the outdoor units are connected with the indoor units through the refrigerant pipe and the manifold pipe. As compared with a number of air conditioners at home, the outdoor units of the multi-connected heat pump system are shared so that the cost of the devices can be lowered effectively, and the respective indoor units can be centrally managed, where one or more of the indoor units can be started separately or concurrently into operation, thus making it more flexible to control.

At present, people are demanding high comfort of their living. In an engineering application, there are some of the indoor units in the multi-connected heat pump system that are refrigerating while the other indoor units are heating. In order to make full use of advantageous energy-saving in the multi-connected heat pump system, heat in the system is recovered in the prior art to enable the operating indoor units to refrigerate and heat concurrently. However, generally a number of four-way valves have to be arranged to allocate the refrigerant and to recover discharged heat, thus making it complex and costly to control the pipes of the system. Moreover, if the prior art is applied in a rainy season and a moist region, then the system has to refrigerate for the purpose of temperature lowering and dehumidification, and if the temperature of the environment is low, then the effect of dehumidification may be poor, and the temperature of outgoing air may be low, thus resulting in degraded thermal comfort.

SUMMARY

An object of the invention is to provide a heat recovery variable-frequency multi-connected heat pump system so as to address the technical problem in the prior art of being complex and costly to control the pipes of the system because the heat in the system has to be recovered using a number of four-way valves.

In order to address the technical problem above, the invention is embodied in the following technical solutions:

A heat recovery variable-frequency multi-connected heat pump system includes an outdoor unit and at least two indoor units, wherein the outdoor unit and the indoor units are connected through a high-pressure liquid pipe, a high-pressure gas pipe, and a low-pressure gas return pipe, wherein:

the outdoor unit includes a four-way valve (4), an outdoor heat exchanger (5), an outdoor electronic expansion valve (6), a second electromagnetic valve (10), a third electromagnetic valve (11), and at least one compressor (1);

an exhaust end of the compressor (1) is connected with an A end of the four-way valve (4); a B end of the four-way valve (4) is connected with the outdoor heat exchanger (5), and an other end of the outdoor heat exchanger (5) is connected with the high-pressure liquid pipe through the outdoor electronic expansion valve (6); a C end of the four-way valve (4) is connected with a suction end of the compressor (1); a D end of the four-way valve (4) is connected with the low-pressure gas return pipe; the third electromagnetic valve (11) is connected between the high-pressure gas pipe and the low-pressure gas return pipe; and one end of the second electromagnetic valve (10) is connected with the A end of the four-way valve (4), and the other end thereof is connected between the third electromagnetic valve (11) and the high-pressure gas pipe;

each of the indoor units includes a first indoor heat exchanger (16), a first electronic expansion valve (15), a second indoor heat exchanger (18), and a second electronic expansion valve (17); and one end of the first indoor heat exchanger (16) is connected with the high-pressure gas pipe, and an other end of the first indoor heat exchanger (16) is connected with the high-pressure liquid pipe through the first electronic expansion valve (15); and one end of the second indoor heat exchangers (18) is connected with the low-pressure gas return pipe, and an other end of the second indoor heat exchanger (18) is connected with the high-pressure liquid pipe through the second electronic expansion valve (17).

Optionally an oil separator (2) is connected between the exhaust end of the compressor (1), and the A end of the four-way valve (4).

Optionally the oil separator (2) is connected with the suction end of the compressor (1) through a first electromagnetic valve (8) and a capillary (9).

Optionally a check valve (3) is connected between the oil separator (2) and the A end of the four-way valve (4).

Optionally a vapor-liquid separator (7) is connected between the C end of the four-way valve (4), and the suction end of the compressor (1).

Optionally a liquid-side stop valve (12) is arranged on the high-pressure liquid pipe; a gas-side stop valve (13) is arranged on the low-pressure gas return pipe; and a discharge line valve (14) is arranged on the high-pressure gas pipe.

An embodiment of the invention further provides a first method for controlling the heat recovery variable-frequency multi-connected heat pump system, the method controlling the heat pump system under a fully-refrigerating condition to perform operations of: connecting the A end and the B end of the four-way valve (4), and connecting the C end and the D end thereof; closing the second electromagnetic valve (10), and opening the third electromagnetic valve (11); fully-opening the outdoor electronic expansion valve (6); and enabling the first electronic expansion valves (15) and the second electronic expansion valves (17) of the respective indoor units to throttle for lower pressure; so that exhaust refrigerant from the exhaust end of the compressor (1) is condensed by the outdoor heat exchanger (5), wherein one branch of the refrigerant flows through the first electronic expansion valves (15) and the first indoor heat exchangers (16) of the respective indoor units, and the third electromagnetic valve (11) to the D end of the four-way valve (4), and an other branch of the refrigerant flows through the second electronic expansion valves (17) and the second indoor heat exchangers (18) of the respective indoor units to the D end of the four-way valve (4); and thereafter the refrigerant enters the suction end of the compressor (1) through the C end of the four-way valve (4).

An embodiment of the invention further provides a second method for controlling the heat recovery variable-frequency multi-connected heat pump system, the method controlling the heat pump system under a fully-heating condition to perform operations of: connecting the A end and the D end of the four-way valve (4), and connecting the B end and the C end thereof; opening the second electromagnetic valve (10), and closing the third electromagnetic valve (11); enabling the outdoor electronic expansion valve (6) to throttle for lower pressure; and enabling both the first electronic expansion valves (15) and the second electronic expansion valves (17) of the respective indoor units to throttle for lower pressure; so that one branch of exhaust refrigerant from the exhaust end of the compressor (1) flows out of the A and D ends of the four-way valve (4) to the second indoor heat exchangers (18) and the second electronic expansion valves (17) of the respective indoor units, and an other branch of the refrigerant flows out of the second electromagnetic valve (10) to the first indoor heat exchangers (16) and the first electronic expansion valves (15) of the respective indoor units; and the refrigerant from the first electronic expansion valve (15), and the refrigerant from the second electronic expansion valve (17) meet, and then flow through the outdoor electronic expansion valve (6), the outdoor heat exchanger (5), and the B and C ends of the four-way valve (4), and enter the suction end of the compressor (1).

An embodiment of the invention further provides a third method for controlling the heat recovery variable-frequency multi-connected heat pump system, the method controlling the heat pump system under a normally-heat-recovery condition to perform operations of: connecting the A end and the B end of the four-way valve (4), and connecting the C end and the D end thereof; opening the second electromagnetic valve (10), and closing the third electromagnetic valve (11); fully-opening the outdoor electronic expansion valve (6); and fully-opening the first electronic expansion valve (15) and fully-closing the second electronic expansion valve (17) in each of a part of the indoor units, and fully-closing the first electronic expansion valve (15) and enabling the second electronic expansion valve (17) to throttle for lower pressure in each of other indoor units; so that one branch of exhaust refrigerant from the exhaust end of the compressor (1) flows through the second electromagnetic valve (10), the first indoor heat exchanger (16), and the first electronic expansion valve (15), and an other branch of the refrigerant flows out of the A and B ends of the four-way valve (4) to the outdoor heat exchanger (5) for being condensation, flows through the outdoor electronic expansion valve (6), then meets the refrigerant flowing out of the first electronic expansion valve (15), further flows through the second electronic expansion valve (17) and the indoor heat exchanger (18) of each of the other indoor units sequentially, and thereafter enters the suction end of the compressor (1) through the D and C ends of the four-way valve (4).

An embodiment of the invention further provides a fourth method for controlling the heat recovery variable-frequency multi-connected heat pump system, the method controlling the heat pump system under a normally-heat-recovery and dehumidifying condition to perform operations of: connecting the A end and the B end of the four-way valve (4), and connecting the C end and the D end thereof; opening the second electromagnetic valve (10), and closing the third electromagnetic valve (11); fully-opening the outdoor electronic expansion valve (6); and fully-opening the first electronic expansion valve (15) and enabling the second electronic expansion valve (17) to throttle for lower pressure in each of indoor units; so that one branch of exhaust refrigerant from the exhaust end of the compressor (1) flows through the outdoor heat exchanger (5), and an other branch of the refrigerant flows through the second electromagnetic valve (10), and the first indoor heat exchanger (16), and the refrigerant flowing out of the first indoor heat exchanger (16), and the refrigerant flowing out of the outdoor heat exchange (5) meet at the second electronic expansion valve (17) and the second indoor heat exchanger (18), and thereafter enter the suction end of the compressor (1) through the D and C ends of the four-way valve (4).

An embodiment of the invention further provides a fifth method for controlling the heat recovery variable-frequency multi-connected heat pump system, the method controlling the heat pump system under a heat-recovery and dehumidifying plus refrigerating hybrid condition to perform operations of: connecting the A end and the B end of the four-way valve (4), and connecting the C end and the D end thereof; opening the second electromagnetic valve (10), and closing the third electromagnetic valve (11); fully-opening the outdoor electronic expansion valve (6); and fully-opening the first electronic expansion valve (15) and enabling the second electronic expansion valve (17) to throttle for lower pressure in each of a part of the indoor units, and fully-closing the first electronic expansion valve (15) and enabling the second electronic expansion valve (17) to throttle for lower pressure in each of other indoor units; so that one branch of exhaust refrigerant from the exhaust end of the compressor (1) flows through the outdoor heat exchanger (5), and the second electronic expansion valve (17) and the second indoor heat exchanger (18) of each of the other indoor units, and an other branch of the refrigerant flows through the second electromagnetic valve (10), and the first indoor heat exchanger (16) of each of the part of the indoor units; and the refrigerant flowing out of the first indoor heat exchangers (16), and the refrigerant flowing out of the outdoor heat exchanger (5) meet at the second electronic expansion valve (17) and the second indoor heat exchanger (18), and the refrigerant flowing through the second indoor heat exchanger (18) of each of the part of the indoor units, and the refrigerant flowing through the second indoor heat exchanger (18) of each of the other indoor units meet, and thereafter enter the suction end of the compressor (1) through the D and C ends of the four-way valve (4).

An embodiment of the invention further provides a sixth method for controlling the heat recovery variable-frequency multi-connected heat pump system, the method controlling the heat pump system under a normally-heat-recovery and dehumidifying plus heating hybrid condition to perform operations of: connecting the A end and the B end of the four-way valve (4), and connecting the C end and the D end thereof; opening the second electromagnetic valve (10), and closing the third electromagnetic valve (11); fully-closing the outdoor electronic expansion valve (6); fully-opening the first electronic expansion valves (15) of the respective indoor units; and enabling the second electronic expansion valves (17) of a part of the indoor units to throttle for lower pressure, and fully-closing the second electronic expansion valves (17) of the other indoor units; so that exhaust refrigerant from the exhaust end of the compressor (1) flows through the second electromagnetic valve (10), wherein one branch of the refrigerant flows through the first indoor heat exchanger (16) and the first electronic expansion valves (15) of each of the part of the indoor units, and an other branch of the refrigerant flows through the first indoor heat exchanger (16) and the first electronic expansion valve (15) of each of the other indoor units; and the refrigerant flowing out of the first electronic expansion valves (15) meets, and then flows through the second electronic expansion valve (17) and the second indoor heat exchanger (18), and the D and C ends of the four-way valve (4) sequentially, and thereafter enters the suction end of the compressor (1).

As compared with the prior art, advantages and positive effects of the invention lie in that the invention is a heat recovery variable-frequency multi-connected heat pump system in which three pipes are designed using a four-way valve, and the indoor units include two sets of electronic expansion valves, and two sets of heat exchangers, so that any one of the indoor units in the system can operate separately to refrigerate, to heat, or to recover heat and dehumidify; and there are six operating conditions in which the multi-connected system may function, i.e., a fully-refrigerating condition, a fully-heating condition, a normally-heat-recovery condition, a normally-heat-recovery and dehumidifying condition, a heat-recovery and dehumidifying plus refrigerating hybrid condition, and a heat-recovery and dehumidifying plus heating hybrid condition. Particularly the principle of heat-recovery and dehumidifying lies in the use of the condenser to exhaust heat to thereby improve the low temperature of outgoing air while dehumidifying at low temperature for the purpose of dehumidifying without lowering the temperature, or of humidifying while raising the temperature, thus improving the thermal comfort and the efficiency of the system, and also improve in effect the capacity of refrigerating and heating by the system. The application scope of the invention can be extended in effect by selecting one of the six operating conditions in which the system functions.

BRIEF DESCRIPTION OF THE DRAWINGS

In order to make the technical solutions according to the embodiments of the invention more apparent, the drawings to which reference is made in the description of the embodiments will be described below briefly, and the drawings described below are merely illustrative of some of the embodiments of the invention, and those ordinarily skilled in the art can further obtain other embodiments from these drawings without any inventive effort. In the drawings.

DETAILED DESCRIPTION OF THE EMBODIMENTS

In order to make the objects, technical solutions, and advantages of the invention more apparent, the invention will be described below in further details with reference to the drawings, and the embodiments described below are only a part but not all of the embodiments of the invention. Based upon the described embodiments of the invention, all the other embodiments which can occur to those skilled in the art without any inventive effort shall fall into the scope of the invention.

First Embodiment

This embodiment relates to an embodiment of the invention including two indoor units by way of an example.

Figure 1:
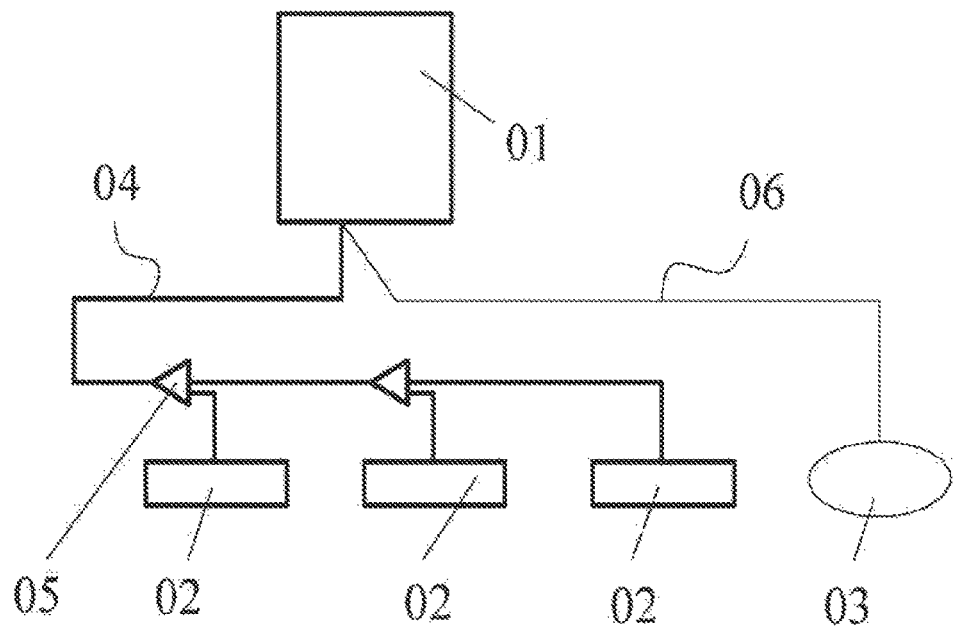
FIG. 1 is a schematic diagram of the connection of the multi-connected heat pump system in the prior art.
Figure 2:
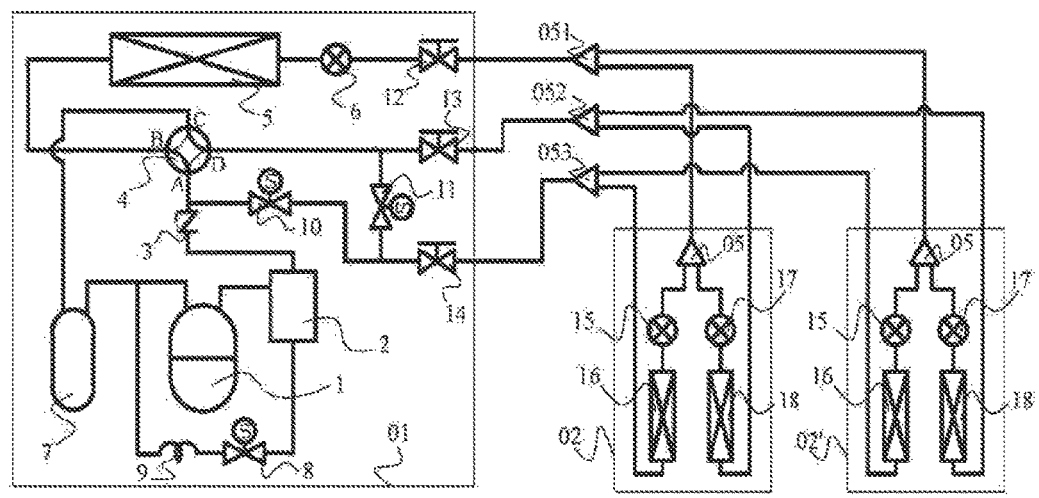
FIG. 2 is a schematic diagram of a system according to an embodiment of the invention.

As illustrated in FIG. 2, a multi-connected heat pump system according to this embodiment includes an outdoor unit 01, and two indoor units 02 and 02'. The outdoor unit 01 includes a compressor 1, an oil separator 2, a check valve 3, a four-way valve 4, an outdoor heat exchanger 5, an outdoor electronic expansion valve 6, a vapor-liquid separator 7, a first electromagnetic valve 8, a capillary 9, a second electromagnetic valve 10, a third electromagnetic valve 11, a liquid-side stop valve 12, a gas-side stop valve 13, and a discharge line valve 14.

The first indoor unit 02 includes a first indoor electronic expansion valve 15, a first indoor heat exchanger 16, a second indoor electronic expansion valve 17, a second indoor heat exchanger 18, and a fourth manifold pipe 05.

The second indoor unit 02' includes the same components as the first indoor unit 02, and it includes a first indoor electronic expansion valve 15, a first indoor heat exchanger 16, a second indoor electronic expansion valve 17, a second indoor heat exchanger 18, and a fourth manifold pipe 05.

The compressor 1 is a variable-frequency compressor that can include one or more compressors connected in parallel.

Each of the outdoor heat exchanger 5, the first indoor heat exchanger 16, and the second indoor heat exchanger 18 is an air-cooling fin-tube heat exchanger, or an aluminum microchannel heat exchanger.

In a real application, a fan of the outdoor unit 01 blows the air that flows through the outdoor heat exchanger 5 for heat exchange between the air and a refrigerant. A fan of the indoor unit 02 or 02' blows the return air that flows through the second indoor heat exchanger 18 and the first indoor heat exchanger 16 sequentially, that is, the air entering an air return port of the indoor unit exchanges heat with firstly the second indoor heat exchanger 18 and then the first indoor heat exchanger 16, and finally flows out of the indoor unit 02 or 02'.

The respective components in the outdoor unit 01 are connected in such a way that an exhaust end of the compressor 1 is connected with an inlet end of the oil separator 2, an air outlet end of the oil separator 2 is connected with one end of the check valve 3, the other end of the check valve 3 is connected with an A-end of the four-way valve 4. Moreover, a B end of the four-way valve 4 is connected with one end of the outdoor heat exchanger 5, the other end of the outdoor heat exchanger 5 is connected with one end of the outdoor electronic expansion valve 6, the other end of the outdoor electronic expansion valve 6 is connected with one end of the liquid-side stop valve 12. Furthermore, a C end of the four-way valve 4 is connected with one end of the vapor-liquid separator 7, and the other end of the vapor-liquid separator 7 is connected with a suction end of the compressor 1. Lastly, a D end of the four-way valve 4 is connected with one end of the third electromagnetic valve 11, and one end of the gas-side stop valve 13, both the other end of the third electromagnetic valve 11, and one end of the discharge line valve 14 are connected with one end of the second electromagnetic valve 10, and the other end of the second electromagnetic valve 10 is connected with the A-end of the four-way valve 4 An oil outlet end of the oil separator 2 is connected with one end of the first electromagnetic valve 8, the other end of the first electromagnetic valve 8 is connected with one end of the capillary 9, and the other end of the capillary 9 is connected with a suction end of the compressor 1.

The outdoor unit 01 is connected with the indoor units 02 and 02' in such a way that the other end of the liquid-side stop valve 12 is connected with one end of the first indoor electronic expansion valve 15 and one end of the second electronic expansion valve 17 through a first manifold pipe 051 and the fourth manifold pipe 05, the other end of the first indoor electronic expansion valve 15 is connected with one end of the first indoor heat exchanger 16, and the other end of the first indoor heat exchanger 16 is connected with the other end of the discharge line valve 14 through a third manifold pipe 053. The other end of the second electronic expansion valve 17 is connected with one end of the second indoor heat exchanger 18, and the other end of the second indoor heat exchanger 18 is connected with the other end of the gas-side stop valve 13 through a second manifold pipe 052.

Rules of closing and opening the respective components of, and flowing of the refrigerant throughout, the multi-connected heat pump system according to this embodiment under respective operating conditions will be described below:

1) Fully-Refrigerating Condition

Figure 3:
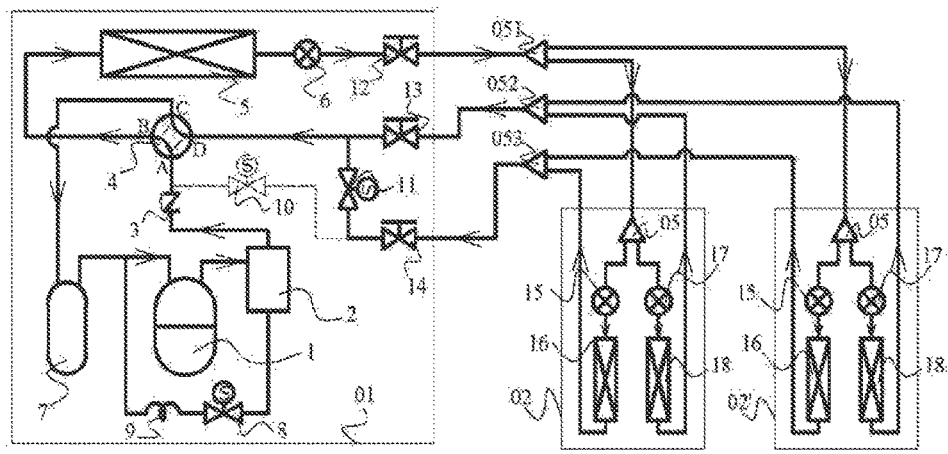
FIG. 3 is a schematic diagram of the system operating under a fully-refrigerating condition according to an embodiment of the invention.

If all the indoor units in the system are refrigerating, then the system will be operating under a fully-refrigerating condition as illustrated in FIG. 3. Under this operating condition, the A end and the B end of the four-way valve 4 of the outdoor unit are connected, and the C end and the D end thereof are connected, the second electromagnetic valve 10 is closed, the third electromagnetic valve 11 is opened, and the outdoor electronic expansion valve 6 is fully-opened. In the indoor units 02 and 02', both the first electronic expansion valves 15 and the second electronic expansion valves 17 are throttling for lower pressure. The outdoor heat exchangers 5 are condensers, and both the first indoor heat exchangers 16 and the second indoor heat exchangers 18 are evaporators.

The exhaust high-pressure gaseous refrigerant from an exhaust end of the compressor 1 passes the oil separator 2, the check valve 3, and the A and B ends of the four-way valve 4, and is condensed by the outdoor heat exchanger 5 into the high-pressure liquid refrigerant, and the high-pressure liquid refrigerant passing through the liquid-side stop valve 12, the first manifold pipe 051, and the fourth manifold pipe 05 is divided into two streams of refrigerant. A first stream of refrigerant flows through the first electronic expansion valves 15 and the first indoor heat exchangers 16 of the indoor units 02 and 02', the third manifold pipe 053, the discharge line valve 14, and the third electromagnetic valve 11 sequentially. A second stream of refrigerant flows through the second electronic expansion valves 17 and the second indoor heat exchangers 18 of the indoor units 02 and 02', the second manifold pipe 052, and the gas-side stop valve 13 sequentially, and then the second stream of refrigerant meets the first stream of refrigerant. The confluent refrigerant enters the vapor-liquid separator 7 through the D and C ends of the four-way valve 4, and is separated into gas and liquid entering the suction end of the compressor 1.

2) Fully-Heating Condition

Figure 4:
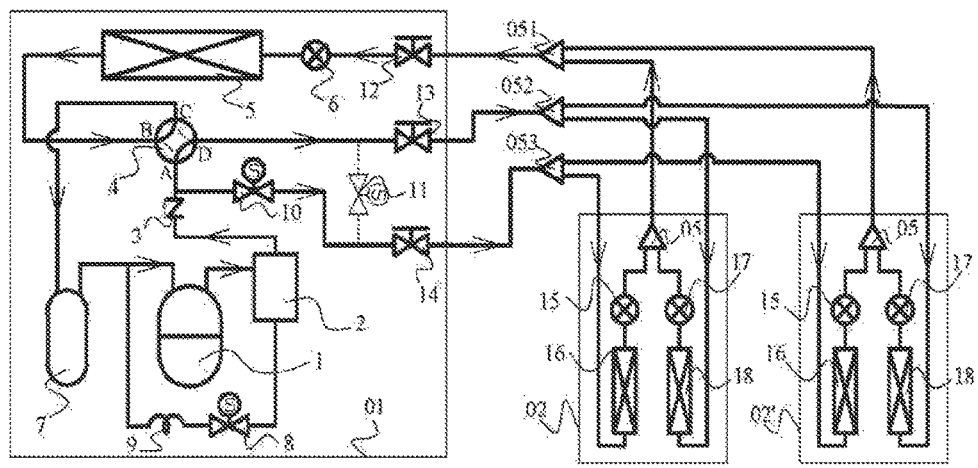
FIG. 4 is a schematic diagram of the system operating under a fully-heating condition according to an embodiment of the invention.

If all the indoor units in the system are heating, then the system will be operating under a fully-heating condition as illustrated in FIG. 4. Under this operating condition, the A end and the D end of the four-way valve 4 of the outdoor unit are connected, and the B end and the C end thereof are connected, the second electromagnetic valve 10 is opened, the third electromagnetic valve 11 is closed, and the outdoor electronic expansion valve 6 is throttling for lower pressure. In the indoor units 02 and 02', the first electronic expansion valves 15 and the second electronic expansion valves 17 are throttling. The outdoor heat exchanger 5 is evaporator, and both the first indoor heat exchangers 16 and the second indoor heat exchangers 18 are condensers.

The exhaust high-pressure gaseous refrigerant from an exhaust end of the compressor 1 passes the oil separator 2 to the check valve 3, and the high-pressure gaseous refrigerant flowing out of the check valve 3 is divided into two streams. A first stream of the refrigerant flows out of the A and D ends of the four-way valve 4, and flows through the gas-side stop valve 13, the second manifold 052, and the second indoor heat exchangers 18 and the second indoor electronic expansion valves 17 of the indoor units 02 and 02' sequentially. A second stream of refrigerant flows out of the second electromagnetic valve 10, and thereafter flows through the discharge line valve 14, the third manifold pipe 053, and the first indoor heat exchangers 16 and the first electronic expansion valves 15 of the indoor units 02 and 02' sequentially. The first and second streams of refrigerant meet at the fourth manifold pipe 05, and then flow through the first manifold pipe 051, the liquid-side stop valve 12, the outdoor electronic expansion valve 6, the outdoor heat exchanger 5, the B and C ends of the four-way valve 4, and the vapor-liquid separator 7 sequentially, and thereafter enter suction end of the compressor 1.

3) Normally-Heat-Recovery Condition

Figure 5:
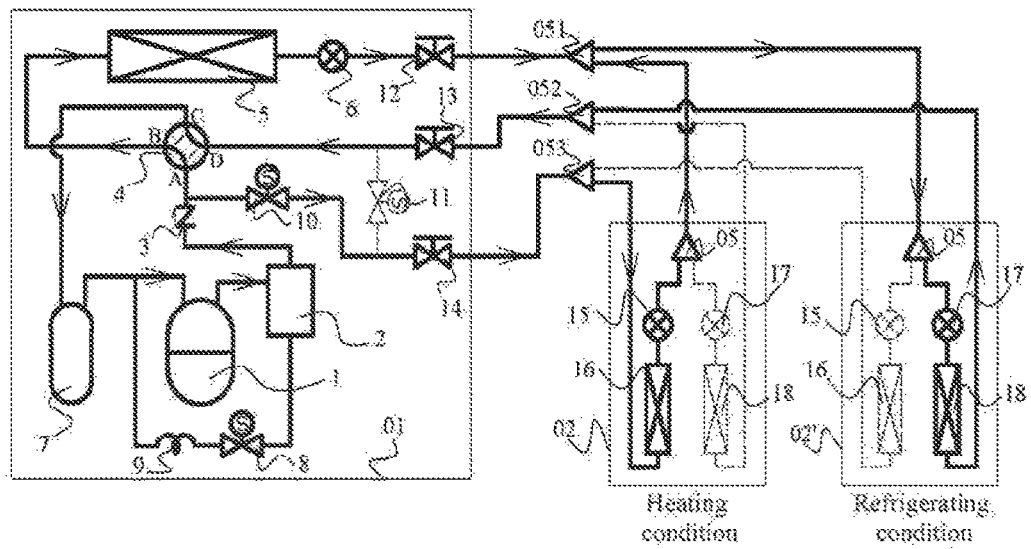
FIG. 5 is a schematic diagram of the system operating under a normally-heat-recovery condition according to an embodiment of the invention.

If a part of the indoor units are heating, and the other indoor units are refrigerating, then the system will be operating under a normally-heat-recovery condition which will be exemplified in an embodiment as illustrated in FIG. 5, where the first indoor unit 02 is heating and the second indoor unit 02' is refrigerating. At this time, the A end and the B end of the four-way valve 4 of the outdoor unit are connected, and the C end and the D end thereof are connected, the second electromagnetic valve 10 is opened, the third electromagnetic valve 11 is closed, and the outdoor electronic expansion valve 6 is fully-opened. In the indoor unit 02, the first electronic expansion valve 15 is fully-opened and the second electronic expansion valve 17 is fully-closed. In the indoor unit 02', the second indoor electronic expansion valve 17 is throttling, and the first indoor electronic expansion valve 15 is fully-closed. Both the outdoor heat exchanger 5, and the first indoor heat exchanger 16 of the indoor unit 02 are condensers, the second indoor heat exchanger 18 of the indoor unit 02' is an evaporator. Neither the second indoor heat exchanger 18 of the indoor unit 02 nor the first indoor heat exchanger 16 of the indoor unit 02' exchanges heat.

The high-pressure gaseous refrigerant flowing out of the check valve 3 is divided into two streams. A first stream of refrigerant flows through the second electromagnetic valve 10 and the discharge line valve 14 sequentially, thereafter enters the first indoor unit 02, further flows through the first indoor heat exchanger 16, the first indoor electronic expansion valve 15, and the fourth manifold pipe 05 sequentially, and thereafter enters the first manifold pipe 051. A second stream of refrigerant flows out of the A and B ends of the four-way valve 4, and is condensed by the condenser 5 into the high-pressure liquid refrigerant, and the high-pressure liquid refrigerant flows through the outdoor electronic expansion valve 6 and the liquid-side stop valve 12, and then also enters the first manifold pipe 051. The first and second streams of refrigerant meet at the first manifold pipe 051, thereafter enter the refrigerating second indoor unit 02', further flow through the fifth manifold pipe 05, the second electronic expansion valve 17, and the second indoor heat exchanger 18 sequentially, then flow out of the second indoor unit 02', further flow into the vapor-liquid separator 7 through the second manifold pipe 052, the gas-side stop valve 13, and the D and C ends of the four-way valve 4, and thereafter enter the suction end of the compressor 1.

4) Normally-Heat-Recovery and Dehumidifying Condition

Figure 6:
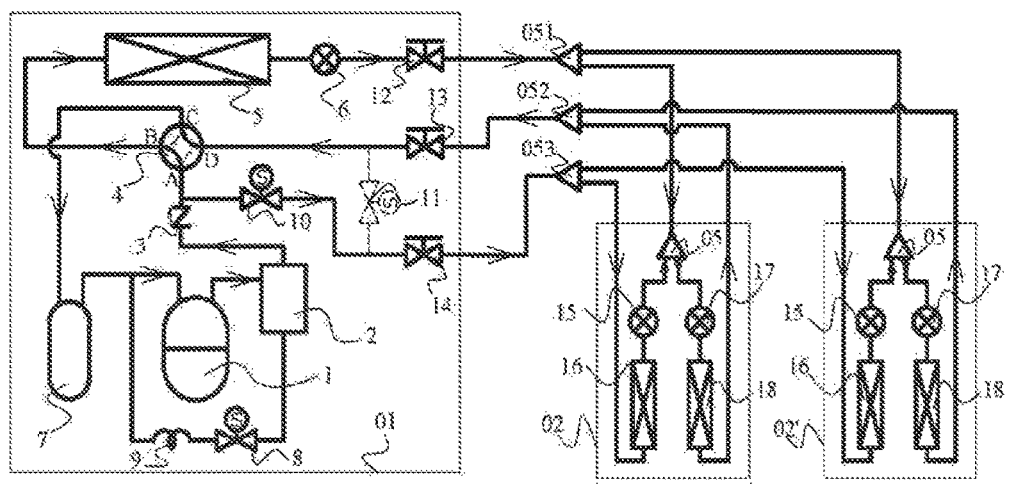
FIG. 6 is a schematic diagram of system operating under a heat-recovery and dehumidifying condition according to an embodiment of the invention.

If the system is operating in a rainy season or a low-temperature and high-humidity environment, then the system will dehumidify indoors and also improve the temperature of outgoing air so as to prevent the temperature of outgoing air from becoming too low, which would otherwise result in degraded thermal comfort. If all the indoor units are operating under the heat-recovery and dehumidifying condition, then the refrigerant will flow as schematically illustrated in FIG. 6. Under the normally-heat-recovery and dehumidifying condition, the respective components in the outdoor unit 01 will be connected, the valves will be opened and closed, and the heat exchangers will function, in substantially the same way as they are under the normally-heat-recovery condition, so a repeated description thereof will be omitted here.

In the indoor units 02 and 02', the first electronic expansion valves 15 are fully-opened, and the second indoor electronic expansion valves 17 are throttling for lower pressure. The first indoor heat exchangers 16 are condensers, which discharge heat to heat the outgoing air through the refrigerant so as to improve the temperature of outgoing air. The second indoor heat exchangers 18 are evaporators, which lower the temperature of and dehumidify the air.

The refrigerant after the condensation and heat exchange by the outdoor heat exchanger 5, and the high-pressure liquid refrigerant after condensation and heat exchange by the first indoor heat exchangers 16 meet at the fourth manifold pipe 05, then flow through the second indoor electronic expansion valves 17, the second indoor heat exchangers 18, the second manifold pipe 052, and the D and C ends of four-way branch 4 sequentially, and thereafter enter the vapor-liquid separator 7, thus completing the refrigeration loop of the refrigerant.

5) Heat-Recovery and Dehumidifying Plus Refrigerating Hybrid Condition

Figure 7:
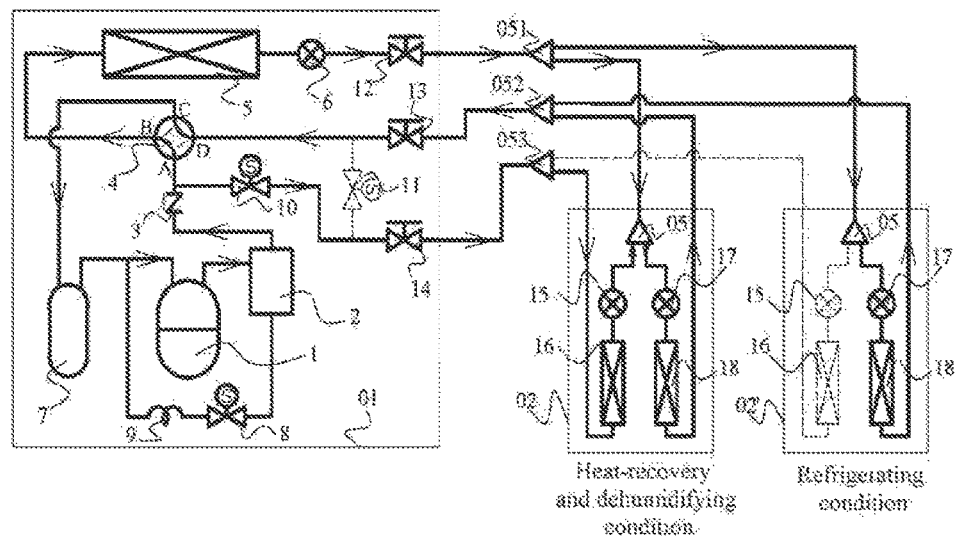
FIG. 7 is a schematic diagram of the system operating under a heat-recycling and dehumidifying plus refrigerating hybrid condition according to an embodiment of the invention.

As illustrated in FIG. 7, there is a schematic diagram where a part of the indoor units are operating under heat-recovery and dehumidifying condition and the other indoor units are under refrigerating condition. The only difference of this hybrid operating condition from the normally-heat-recovery and dehumidifying condition lies in that the first indoor electronic expansion valve 15 of the refrigerating indoor unit 02' is fully-closed so that the second indoor heat exchanger 16 does not exchange heat. Except for this, the respective components in the outdoor units and the indoor units will be connected, the valves will be opened and closed, and the refrigerant will flow, in substantially the same way as they are under the normally-heat-recovery and dehumidifying condition, so a repeated description thereof will be omitted here.

6) Heat-Recovery and Dehumidifying Plus Heating Hybrid Condition

Figure 8:
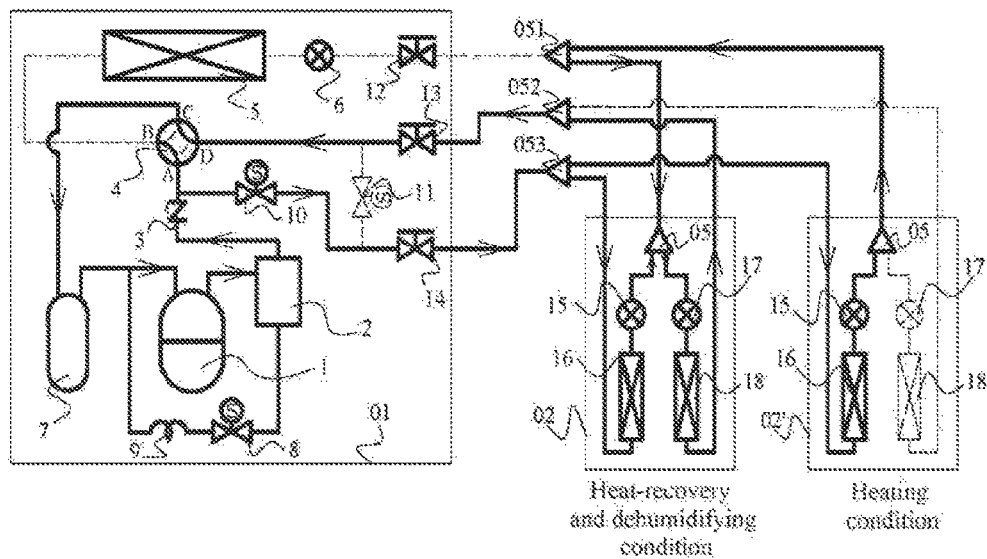
FIG. 8 is a schematic diagram of the system operating under a heat-recycling and dehumidifying plus heating hybrid condition according to an embodiment of the invention.
Figure 9:
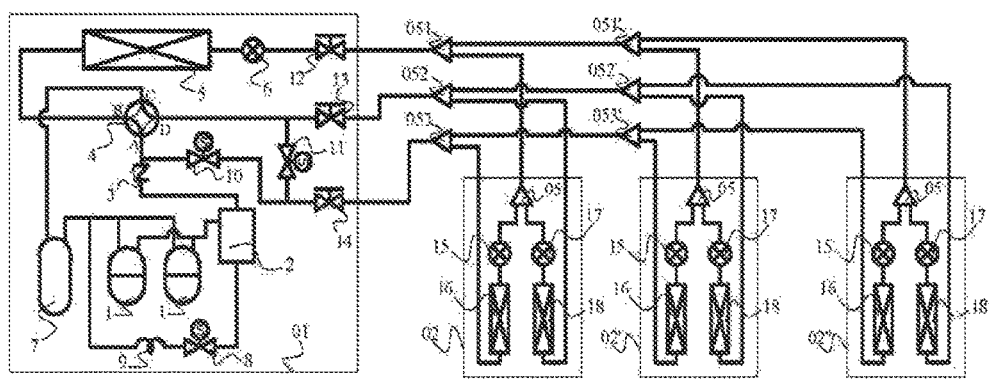
FIG. 9 is a schematic diagram of a system according to another embodiment of the invention.

As illustrated in FIG. 8, there is a schematic diagram where a part of the indoor units are under heat-recovery and dehumidifying condition and the other indoor units are under heating condition. Under this hybrid operating condition, the outdoor electronic expansion valve 6 is fully-closed, and the outdoor heat exchanger 5 does not exchange heat. The first electronic expansion valve 15 of the indoor unit 02 is fully-opened, and the second electronic expansion valve 17 thereof is throttling for lower pressure. The first electronic expansion valve 15 of the indoor unit 02' is fully-opened and the second indoor electronic expansion valve 17 thereof is fully-closed. The first indoor heat exchanger 16 of the indoor unit 02 is a condenser and the second indoor heat exchanger 18 thereof is an evaporator. The first indoor heat exchanger 16 of the indoor unit 02' is a condenser and the second indoor heat exchanger 18 does not exchange heat.

All the exhaust high-pressure refrigerant gas from the discharge end of the compressor 1 flow through the second electromagnetic valve 10 and the discharge line valve 14, and further enters the third manifold pipe 053 and is divided into two streams. A first stream of refrigerant flows through the first indoor heat exchanger 16 and the first electronic expansion valve 15 of the indoor unit 02 sequentially, and thereafter enters the fourth manifold pipe 05. A second stream of refrigerant flows through the first indoor heat exchanger 16 and the first electronic expansion valve 15 of the indoor unit 02' and the fifth manifold pipe 05 sequentially, and further passes the first manifold pipe 051, and thereafter enters the fourth manifold pipe 05 of the indoor unit 02. The first and second streams of refrigerant meet at the fourth manifold pipe 05 of the indoor unit 02, then flow through the second electronic expansion valve 17, the second indoor heat exchanger 18, the second manifold pipe 052, the gas-side stop valve 13, and the D and C ends of the four-way valve 4, and thereafter enter the vapor-liquid separator 7, thus completing the loop of the refrigerant.

Second Embodiment

A multi-connected heat pump system according to this embodiment includes an outdoor unit 01, and three indoor units 02, 02' and 02", where the outdoor unit 01 includes two variable-frequency compressors 1 connected in parallel. Pipes of the indoor unit 02" meet pipes of the indoor unit 02' through manifold pipes 051', 052', and 053' respectively. Structures and operating conditions of the other components will be the same as in the first embodiment, so a repeated description thereof will be omitted here.

It shall be noted that the methods according to the invention can be applied to a system including an outdoor unit and at least two indoor units, so the first embodiment of the invention will encompass the embodiment of the invention including two indoor units as exemplified in detail herein without any limitation thereto, and alike the second embodiment of the invention will encompass the embodiment of the invention including three indoor units as exemplified in detail herein without any limitation thereto.

Those skilled in the art shall appreciate that the embodiments of the invention can be embodied as a method, a system, or a computer program product. Therefore, the invention can be embodied in the form of a fully-hardware embodiment, a fully-software embodiment, or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flowchart and/or a block diagram of the method, the device (system), and the computer program product according to the embodiments of the invention. It shall be appreciated that respective flows and/or blocks in the flowchart and/or the block diagram and combinations of the flows and/or the blocks in the flowchart and/or the block diagram can be embodied in computer program instructions. These computer program instructions can be loaded onto a general-purpose computer, a specific-purpose computer, an embedded processor, or a processor of another programmable data processing device to produce a machine so that the instructions executed on the computer or the processor of the other programmable data processing device create means for performing the functions specified in the flow(s) of the flowchart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flowchart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flowchart and/or the block(s) of the block diagram.

Although the preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention.

Evidently those skilled in the art can make various modifications and variations to the invention without departing from the scope of the invention. Thus, the invention is also intended to encompass these modifications and variations thereto so long as the modifications and variations come into the scope of the claims appended to the invention and their equivalents.

The invention claimed is:

1. A heat recovery variable-frequency multi-connected heat pump system, comprising an outdoor unit and at least two indoor units, wherein the outdoor unit and the indoor units are connected through a pipe adapted to convey high-pressure liquid, a pipe adapted to convey high-pressure gas, and a pipe adapted to return low-pressure gas, wherein:

the outdoor unit comprises a four-way valve, an outdoor heat exchanger, an outdoor electronic expansion valve, a second electromagnetic valve, a third electromagnetic valve, and at least one compressor;

an exhaust end of the compressor is connected with an A end of the four-way valve; a B end of the four-way valve is connected with the outdoor heat exchanger, and an other end of the outdoor heat exchanger is connected with the pipe adapted to convey high-pressure liquid through the outdoor electronic expansion valve; a C end of the four-way valve is connected with a suction end of the compressor; a D end of the four-way valve is connected with the pipe adapted to return low-pressure gas; the third electromagnetic valve is connected between the pipe adapted to convey high-pressure gas and the pipe adapted to return low-pressure gas; and one end of the second electromagnetic valve is connected with the A end of the four-way valve, and the other end thereof is connected between the third electromagnetic valve and the pipe adapted to convey high-pressure gas;

each of the indoor units comprises a first indoor heat exchanger, a first electronic expansion valve, a second indoor heat exchanger, and a second electronic expansion valve; and one end of the first indoor heat exchanger is connected with the pipe adapted to convey high-pressure gas, and an other end of the first indoor heat exchanger is connected with the pipe adapted to convey high-pressure liquid through the first electronic expansion valve; and one end of the second indoor heat exchanger is connected with the pipe adapted to return low-pressure gas, and an other end of the second indoor heat exchanger is connected with the pipe adapted to convey high-pressure liquid through the second electronic expansion valve.

2. The heat recovery variable-frequency multi-connected heat pump system according to claim 1, wherein an oil separator is connected between the exhaust end of the compressor, and the A end of the four-way valve.

3. The heat recovery variable-frequency multi-connected heat pump system according to claim 2, wherein the oil separator is connected with the suction end of the compressor through a first electromagnetic valve and a capillary.

4. The heat recovery variable-frequency multi-connected heat pump system according to claim 2, wherein a check valve is connected between the oil separator and the A end of the four-way valve.

5. The heat recovery variable-frequency multi-connected heat pump system according to claim 1, wherein a vapor-liquid separator is connected between the C end of the four-way valve, and the suction end of the compressor.

6. The heat recovery variable-frequency multi-connected heat pump system according to claim 1, wherein a liquid-side stop valve is arranged on the pipe adapted to convey high-pressure liquid; a gas-side stop valve is arranged on the pipe adapted to return low-pressure gas; and a discharge line valve is arranged on the pipe adapted to convey high-pressure gas.

7. A method for controlling the heat recovery variable-frequency multi-connected heat pump system according to claim 1, the method controlling the heat pump system under a fully-refrigerating condition to perform operations of:
connecting the A end and the B end of the four-way valve, and connecting the C end and the D end thereof;
closing the second electromagnetic valve, and opening the third electromagnetic valve;
fully-opening the outdoor electronic expansion valve; and
enabling the first electronic expansion valves and the second electronic expansion valves of the respective indoor units to throttle for lower pressure;
so that exhaust refrigerant from the exhaust end of the compressor is condensed by the outdoor heat exchanger, wherein one branch of the refrigerant flows through the first electronic expansion valves and the first indoor heat exchangers of the respective indoor units, and the third electromagnetic valve to the D end of the four-way valve, and the other branch of the refrigerant flows through the second electronic expansion valves and the second indoor heat exchangers of the respective indoor units to the D end of the four-way valve; and thereafter the refrigerant enters the suction end of the compressor through the C end of the four-way valve.

8. The method according to claim 7, further controlling the heat pump system under a fully-heating condition to perform operations of:
connecting the A end and the D end of the four-way valve, and connecting the B end and the C end thereof;
opening the second electromagnetic valve, and closing the third electromagnetic valve;
enabling the outdoor electronic expansion valve to throttle for lower pressure; and
enabling both the first electronic expansion valves and the second electronic expansion valves of the respective indoor units to throttle for lower pressure;
so that one branch of exhaust refrigerant from the exhaust end of the compressor flows out of the A and D ends of the four-way valve to the second indoor heat exchangers and the second electronic expansion valves of the respective indoor units, and an other branch of the refrigerant flows out of the second electromagnetic valve to the first indoor heat exchangers and the first electronic expansion valves of the respective indoor units; and the refrigerant from the first electronic expansion valve, and the refrigerant from the second electronic expansion valve meet, and then flow through the outdoor electronic expansion valve, the outdoor heat exchanger, and the B and C ends of the four-way valve, and enter the suction end of the compressor.

9. The method according to claim 7, further controlling the heat pump system under a normally-heat-recovery condition to perform operations of:
connecting the A end and the B end of the four-way valve, and connecting the C end and the D end thereof;
opening the second electromagnetic valve, and closing the third electromagnetic valve;
fully-opening the outdoor electronic expansion valve; and
fully-opening the first electronic expansion valve and fully-closing the second electronic expansion valve in each of a part of the indoor units, and fully-closing the first electronic expansion valve and enabling the second electronic expansion valve to throttle for lower pressure in each of other indoor units;
so that one branch of exhaust refrigerant from the exhaust end of the compressor flows through the second electromagnetic valve, the first indoor heat exchanger, and the first electronic expansion valve, and other branch of the refrigerant flows out of the A and B ends of the four-way valve to the outdoor heat exchanger for being condensation, flows through the outdoor electronic expansion valve, then meets the refrigerant flowing out of the first electronic expansion valve, further flows through the second electronic expansion valve and the indoor heat exchanger of each of the other indoor units sequentially, and thereafter enters the suction end of the compressor through the D and C ends of the four-way valve.

10. The method according to claim 7, further controlling the heat pump system under a normally-heat-recovery and dehumidifying condition to perform operations of:
connecting the A end and the B end of the four-way valve, and connecting the C end and the D end thereof;
opening the second electromagnetic valve, and closing the third electromagnetic valve;
fully-opening the outdoor electronic expansion valve; and
fully-opening the first electronic expansion valve and enabling the second electronic expansion valve to throttle for lower pressure in each of the indoor units;
so that one branch of exhaust refrigerant from the exhaust end of the compressor flows through the outdoor heat exchanger, and other branch of the refrigerant flows through the second electromagnetic valve, and the first indoor heat exchanger, and the refrigerant flowing out of the first indoor heat exchanger, and the refrigerant flowing out of the outdoor heat exchanger meet at the second electronic expansion valve and the second indoor heat exchanger, and thereafter enter the suction end of the compressor through the D and C ends of the four-way valve.

11. The method according to claim 7, further controlling the heat pump system under a heat-recovery and dehumidifying plus refrigerating hybrid condition to perform operations of:
connecting the A end and the B end of the four-way valve, and connecting the C end and the D end thereof;
opening the second electromagnetic valve, and closing the third electromagnetic valve;
fully-opening the outdoor electronic expansion valve; and
fully-opening the first electronic expansion valve and enabling the second electronic expansion valve to throttle for lower pressure in each of a part of the indoor units, and fully-closing the first electronic expansion valve and enabling the second electronic expansion valve to throttle for lower pressure in each of other indoor units;

so that one branch of exhaust refrigerant from the exhaust end of the compressor flows through the outdoor heat exchanger, and the second electronic expansion valve and the second indoor heat exchanger of each of the other indoor units, and other branch of the refrigerant flows through the second electromagnetic valve, and the first indoor heat exchanger of each of the part of the indoor units; and the refrigerant flowing out of the first indoor heat exchanger, and the refrigerant flowing out of the outdoor heat exchanger meet at the second electronic expansion valve and the second indoor heat exchanger, and the refrigerant flowing through the second indoor heat exchanger of each of the part of the indoor units, and the refrigerant flowing through the second indoor heat exchanger of each of the other indoor units meet, and thereafter enter the suction end of the compressor through the D and C ends of the four-way valve.

12. The method according to claim 7, further controlling the heat pump system under a normally-heat-recovery and dehumidifying plus heating hybrid condition to perform operations of:

connecting the A end and the B end of the four-way valve, and connecting the C end and the D end thereof;

opening the second electromagnetic valve, and closing the third electromagnetic valve;

fully-closing the outdoor electronic expansion valve;

fully-opening the first electronic expansion valves of the respective indoor units; and enabling the second electronic expansion valves of a part of the indoor units to throttle for lower pressure, and fully-closing the second electronic expansion valves of the other indoor units;

so that exhaust refrigerant from the exhaust end of the compressor flows through the second electromagnetic valve, wherein one branch of the refrigerant flows through the first indoor heat exchanger and the first electronic expansion valve of each of the part of the indoor units, and an other branch of the refrigerant flows through the first indoor heat exchanger and the first electronic expansion valve of each of the other indoor units; and the refrigerant flowing out of the first electronic expansion valves meets, and then flows through the second electronic expansion valve and the second indoor heat exchanger, and the D and C ends of the four-way valve sequentially, and thereafter enters the suction end of the compressor.

* * * * *